Nov. 24, 1925.
M. J. WEBER
1,562,532
STANDARD FOR SCALES AND THE LIKE
Filed Feb. 3, 1922
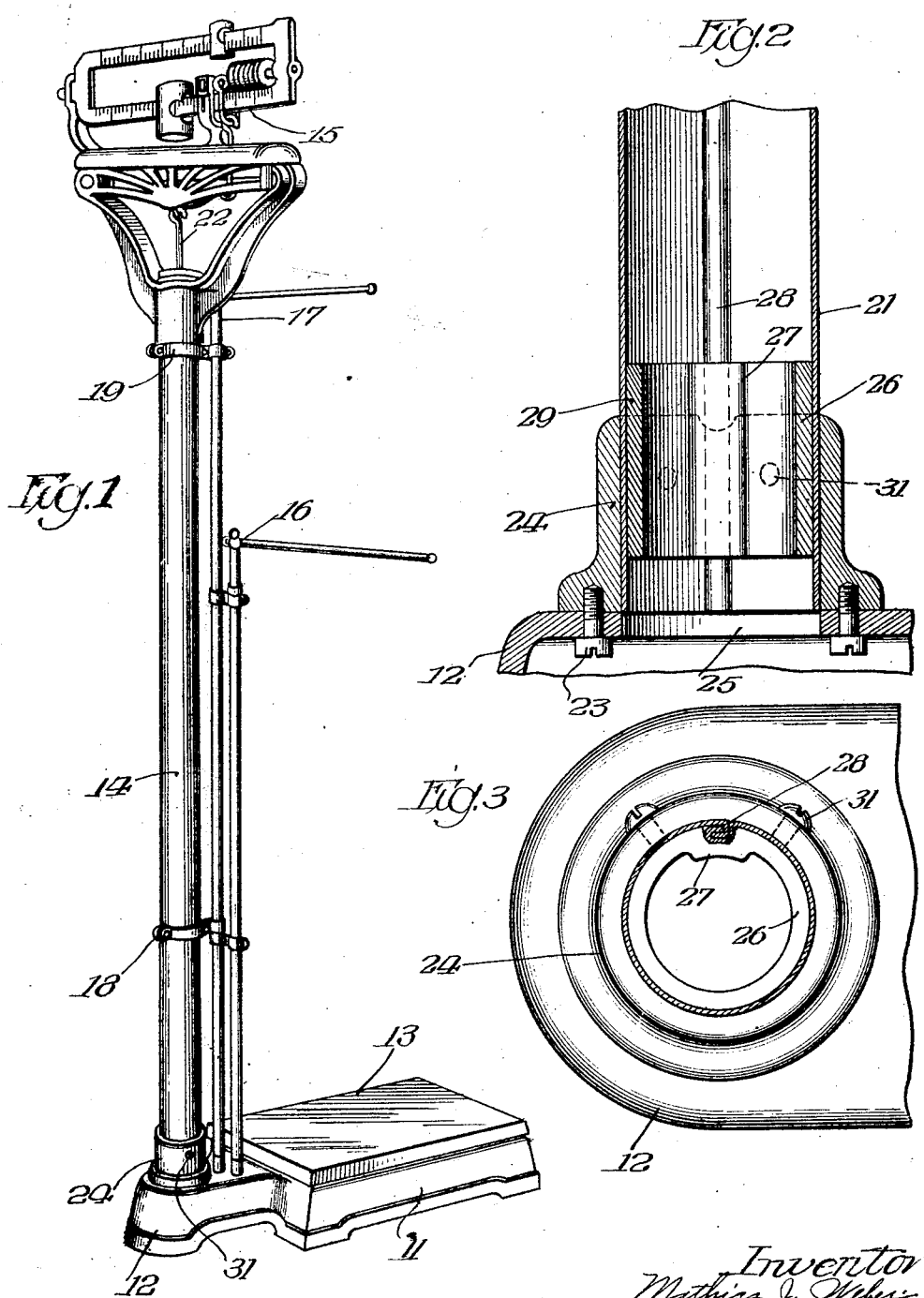

Patented Nov. 24, 1925.

1,562,532

UNITED STATES PATENT OFFICE.

MATHIAS J. WEBER, OF CHICAGO, ILLINOIS, ASSIGNOR TO CONTINENTAL SCALE WORKS, OF CHICAGO, ILLINOIS, A CORPORATION OF ILLINOIS.

STANDARD FOR SCALES AND THE LIKE.

Application filed February 3, 1922. Serial No. 533,791.

*To all whom it may concern:*

Be it known that I, MATHIAS J. WEBER, a citizen of the United States, residing in Chicago, in the county of Cook and State of Illinois, have invented a new and useful Improvement in Standards for Scales and the like, of which the following is a specification.

The present invention relates in general to weighing scales of the type in which the weight indicating mechanism is positioned a distance above the base in order to be in the line of vision of a person being weighed, and has more particular reference to standards or supports for said indicating mechanism of improved and economical form.

In the usual construction of scales of this type the upright or body part of the standard is formed of a relatively heavy material throughout in order to prevent distortion or bending in service. This type of upright is necessarily expensive, requiring a one-piece heavy metal part of costly manufacture. Inasmuch as the strain upon an upright or standard of this character is principally at or near the base thereof, I have found that a relatively light material may be used for the body of the upright provided suitable bracing or strengthening members be employed to receive and hold the lower end thereof. It is accordingly a principal object of my invention to provide a standard for the purpose stated which involves the use of an upright or body part of sheet metal or other light material so strengthened and supported that its strength is substantially equivalent to that of the heavy standards referred to, or, in any event, entirely sufficient for the purpose.

A further object of the invention is the provision of a base support for the upright, comprising a socket and a strengthening member within the upright and extending above the socket whereby bending strains exerted immediately above the socket are resisted.

Another object of the invention is the provision of a standard of this character in which the upright and the holding members are secured together and held in relative fixed position by simple and adjustable holding means, such as set screws.

Another and highly important object of my invention is the reduction of the weight of the assembled scale structure. This is of prime importance in scales of this character for a number of reasons, among which are the saving of a large percent of the freight charges in shipment and the facilitation of moving the scales from place to place, it being remembered in this connection that these scales have large use in schools and health centers where frequent moving is required.

Numerous other objects and advantages of the invention will be apparent as it is better understood from the following description, which, taken in connection with the accompanying drawings, discloses a preferred embodiment thereof.

Referring to the drawings,

Figure 1 is a perspective of the type of platform weighing scales upon which my invention is employed;

Fig. 2 is an enlarged vertical section taken through the lower part of the upright and its base; and Fig. 3 is a plan view of the base parts, being taken transversely through the upright.

Upon the drawings I have shown, for purposes of illustration, weighing scales comprising primarily a base support 11 having a rearwardly extending standard supporting part 12, a platform 13, a standard 14 and weight-indicating mechanism generally indicated by the reference character 15. It is obvious that any general type of scale construction may be employed, and it will be observed that in the present instance I have shown measuring devices 16 and 17, such as are frequently used on physicians' or hospital scales for the purpose of taking the measurement of the person being weighed. These devices are secured to the upright by suitable straps 18 and 19, and while it is evident that, strictly, they do not form any part of the invention, their presence contributes to the desirability of maintaining the standard always in direct vertical position.

The sheet metal upright, which is designated by the character 21, is of hollow or tubular form, providing a casing for the hooked rod 22 by which the weight-indicating mechanism is operated. Secured to the base 12 by means of screws 23 is a socket forming member 24 which preferably is of relatively heavy material, though it need not be of very great length. The upright 21 is inserted in the socket formed by this member and the base part 12 is provided with an aperture 25 through which the upright may extend to permit adjustments. An interior collar 26 is positioned within the hollow upright, this part being preferably of relatively heavy material also and provided on one side with a thick recessed part 27 adapted to receive the inwardly extending interfolded flanges 28 of the upright. It will thus be observed that the collar 26 fits snugly within said upright, and it is pointed out that the upper part 29 of the collar protrudes above the top of the socket forming member 24. The parts thus assembled are in relatively tight frictional engagement, but to provide a positive means for holding them in fixed relationship, I employ set screws 31 extending through the member 24 and the wall of the uprights and bearing against the collar 26. In this manner a strong base construction is provided, the upper part 29 of the collar 26 serving to resist bending strains immediately above the socket member 24, which, as has been stated, is the point at which the greatest strain occurs. The parts are easily adjustable or removable and the structure has the same substantial appearance, and, in fact, practically the same strength as the more expensive standards heretofore employed.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A standard for weighing scales and the like, comprising a tubular upright of sheet metal, a socket forming member receiving an end of said upright, an interior collar positioned within the upright and located partially within and partially above said socket forming member, and holding means extending through the socket forming member and the upright and bearing against said interior collar.

2. A standard for weighing scales and the like, comprising a tubular upright of relatively light material, relatively heavier base members positioned respectively within and without said upright, and means for securing the upright in fixed position between said members.

3. A standard for weighing scales and the like, comprising a tubular upright of relatively light material, relatively heavier base members positioned respectively within and without said upright, and holding means extending through said outer member and the upright and bearing against said inner member.

4. A standard for weighing scales and the like, comprising a hollow upright of relatively light material, relatively heavier base members positioned within and without said upright, the inner member extending above the outer, and means for holding said parts in fixed relative position.

5. A standard for weighing scales and the like, comprising a hollow upright of relatively light material, relatively heavier end-holding members positioned respectively within and without said upright, and means for securing the upright in fixed position between said members.

6. A standard for weighing scales and the like, comprising a tubular upright of relatively light material, a socket member receiving an end of said upright, and an internal collar fitting snugly within the upright and formed in accordance with the internal contour thereof, said collar being located partially within and partially above said socket member.

7. A standard for weighing scales and the like, comprising a tubular upright of relatively light material, end-receiving parts comprising interior and exterior end holding members engaging the upright in overlapped relationship and securing said upright therebetween.

8. In weighing scales, the combination of a base, weight-indicating means above said base, and a support for said weight-indicating means, said support comprising a hollow sheet metal upright, a socket forming member on said base and receiving an end of said upright, a bracing member within the upright and positioned partly within and partly above said socket forming member, and means for holding said parts in fixed relative position.

9. A standard for weighing scales and the like, comprising a hollow upright of relatively light material, and relatively heavier base members positioned on the interior and exterior of said upright, the inner member extending above the outer and said upright being held between said base members.

10. A standard for weighing scales and the like, comprising a sheet metal tubular upright, and relatively heavier base members arranged respectively upon the interior and exterior of said upright and bracing the lower end thereof, said standard being adapted to be supported upon a base part of the scales.

11. A standard for weighing scales and the like, comprising a sheet metal tubular upright, and relatively heavier base members arranged respectively upon the interior and exterior of said upright and bracing the lower end thereof, said standard being adapted to be supported upon a base part of the scales and said sheet metal upright having an inwardly extending side seam and said interior member being formed to receive said seam to provide a tight fit and prevent relative rotation of the parts.

12. A standard for weighing scales and the like, comprising a tubular upright of relatively light material, and end receiving and bracing parts arranged respectively on the interior and exterior of said upright, said parts being slidably assembled and having fixed relative position after assembly and the standard being adapted to be supported upon a base part of the scales.

13. A standard for weighing scales and the like, comprising a tubular upright of relatively light material, and end receiving and bracing parts arranged respectively on the interior and exterior of said upright, said parts being slidably assembled and having fixed relative position after assembly, said upright and interior part being interengaged to prevent relative rotation thereof, and said standard being adapted to be supported upon a base part of the scales.

MATHIAS J. WEBER.